Patented July 26, 1927.

1,636,776

UNITED STATES PATENT OFFICE.

OSCAR F. HEDENBURG, OF PITTSBURGH, PENNSYLVANIA, ASSIGNOR TO REX RESEARCH CORPORATION, OF TOLEDO, OHIO, A CORPORATION OF DELAWARE.

POISON COMPOSITION.

No Drawing.     Application filed February 19, 1926. Serial No. 89,296.

The present invention relates to a new composition of matter for use as a poison for pests, such as rats, mice, crows, grasshoppers, etc. The new composition of the present invention contains colloidal or suspensoid arsenious oxide, (white arsenic) and has proved to be a most effective and rapid poison for pests.

If ordinary white arsenic in powder form is mixed with food material and used as a rat poison, the action is slow, hence, if the rat takes only a nibble, it may not be killed. Even in larger amounts, the time required to kill a rat may be as much as 24 hours or more.

As distinguished from such compositions, the improved composition of the present invention, containing colloidal white arsenic, is very rapid and effective in killing rats, requiring, for example, only about 30 to 60 minutes or less.

Ordinary white arsenic is only slightly soluble in cold water, and it goes into solution very slowly, because the particles are not readily wet by water. As distinguished from such form of arsenic, the colloidal white arsenic utilized in the present invention is finely divided and suspensible in water in a state that makes it very rapidly absorbed by tissues.

One method of preparing the colloidal white arsenic, and a method which is particularly advantageous, is to grind ordinary white arsenic in a ball mill until the white arsenic is so finely divided that it exhibits the Brownian movement, showing that the white arsenic is in a colloidal condition. This grinding is carried out in the presence of materials such as glue, for example, using 450 parts of white arsenic and a solution of 20 parts of glue in 130 parts of water, the parts being by weight. Such a composition, when ground in a ball mill for a sufficient period of time, e. g. around ten hours or more, will be reduced to a colloidal state, in which state it can be used to advantage according to the present invention.

Instead of using glue, other protective colloids of a similar or suitable nature can be used, for example, gum arabic or sodium caseinate, etc.

The product produced by the specific example above given has around 70% to 75% of arsenious oxide, although this percentage can be varied.

The colloidal white arsenic composition prepared as above described, is used in preparing a rat poison composition. For example, 43 parts by weight of the colloidal white arsenic composition containing about 70% of arsenious oxide ($As_2O_3$) are admixed with 20 parts by weight of ground raw meat, 20 parts by weight of corn meal, and 16 parts by weight of water, and the resulting mixture made into a paste by thorough admixture of the ingredients. The resulting compositions will contain about 30% of arsenious oxide, hence, if a rat takes only a nibble of it, it will die. The composition may be used in paste form, or it may be dried and used in the dry condition. Also, different ingredients may be used in making the poison composition, such as other food ingredients which makes the composition attractive to rats or other pests.

The new composition, in paste form, can advantageously be marketed in collapsible metal tubes, from which the desired amount may be squeezed when the composition is to be used.

Another method of making colloidal white arsenic for use in the new composition, but a method which I consider less advantageous, is the following:

5 parts of gelatine are soaked in 20 parts of water and heat supplied to melt the gelatine, after which 50 parts of a sodium arsenite solution (containing 50% of arsenious oxide) are added, and an additional 50 parts of water, these parts being by weight. This mixture is agitated and a suitable acid added in excess to decompose the sodium arsenite solution, thereby liberating arsenious oxide, which separates in a colloidal condition in the presence of the gelatine, giving a milky white solution containing about 18% of arsenious oxide.

Different acids can be used, with resulting formation of the corresponding sodium salts and setting free of arsenious oxides in a colloidal form. When glacial acetic acid (about 15 parts by weight) is used, sodium acetate is formed by the reaction between sodium arsenite and the acetic acid.

Instead of using gelatine in the process just described, other suitable colloidal substances can be used, such as glue, gum arabic, flour, etc.

The colloidal white arsenic produced in this way can be mixed with ground raw meat, corn meal, etc., and formed into poison compositions which have a much more rapid killing effect upon rats or other pests, than ordinary white arsenic compositions.

The colloidal arsenious oxides may be mixed in insecticide compositions, for example, to make a composition suitable for killing grasshoppers or other foliage pests. It may also be used against other pests, such as crows and coyotes, or against field mice, etc., by admixing it with other appropriate ingredients which will make it attractive to such pests. It may be used for example, to coat wheat or other whole grain, and the coated grain then dried for use against field mice.

I regard the method first described as more advantageous, being free from salt formed by reaction of the sodium arsenite and the acid used to set free the arsenious oxide.

It will thus be seen that the present invention provides a new and improved poison composition, containing white arsenic in colloidal form, such that it has a rapid killing action upon rats and other pests, even when eaten in only very small amounts.

I claim:—

1. A poison composition for pests containing colloidal white arsenic.

2. A poison composition for pests containing colloidal white arsenic and organic colloidal material.

3. A poison composition for pests containing colloidal white arsenic, organic colloidal material and food material, the amount of colloidal white arsenic being about 30% of the product.

4. The method of preparing colloidal white arsenic which comprises grinding ordinary white arsenic in the presence of water and an organic colloid until the particles exhibit the Brownian movement.

5. A poison composition for pests containing colloidal white arsenic and food material.

6. A poison composition for pests containing colloidal white arsenic and food material, the amount of colloidal white arsenic being about 30% of the product.

7. A poison composition for pests consisting of colloidal white arsenic, meat and cereal.

In testimony whereof I affix my signature.

OSCAR F. HEDENBURG.